US012780183B2

(12) United States Patent
Takeda et al.

(10) Patent No.: US 12,780,183 B2
(45) Date of Patent: Nov. 3, 2026

(54) PARKING CONTROL METHOD AND PARKING CONTROL DEVICE

(71) Applicant: Nissan Motor Co., Ltd., Yokohama (JP)

(72) Inventors: Muku Takeda, Kanagawa (JP); Yasuhiro Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 19/152,321

(22) PCT Filed: Jan. 31, 2023

(86) PCT No.: PCT/JP2023/003105
§ 371 (c)(1),
(2) Date: Jul. 30, 2025

(87) PCT Pub. No.: WO2024/161522
PCT Pub. Date: Aug. 8, 2024

(65) Prior Publication Data
US 2026/0225583 A1 Aug. 6, 2026

(51) Int. Cl.
*B60W 30/06* (2006.01)
*B60W 40/06* (2012.01)
*B60W 50/00* (2006.01)

(52) U.S. Cl.
CPC ............ *B60W 30/06* (2013.01); *B60W 40/06* (2013.01); *B60W 50/00* (2013.01); *B60W 2050/0022* (2013.01); *B60W 2420/403* (2013.01)

(58) Field of Classification Search
CPC ...... B60W 30/06; B60W 40/06; B60W 50/00; B60W 2050/0022; B60W 2420/403
See application file for complete search history.

(56) References Cited

U.S. PATENT DOCUMENTS

| | | | |
|---|---|---|---|
| 2021/0107465 A1 | 4/2021 | Hiei | |
| 2023/0245471 A1 | 8/2023 | Hiei | |
| 2024/0412533 A1 | 12/2024 | Hiei | |

FOREIGN PATENT DOCUMENTS

| | | |
|---|---|---|
| JP | 2021-062684 A | 4/2021 |

OTHER PUBLICATIONS

English translation of Written Opinion of the International Searching Authority for PCT/JP2023/003105; mailing date Apr. 18, 2023. (Year: 2023).*

* cited by examiner

*Primary Examiner* — Calvin Cheung
(74) *Attorney, Agent, or Firm* — Young Basile Hanlon & MacFarlane, P.C.

(57) ABSTRACT

A processor of a parking control device calculates a target parking position with respect to a vehicle by associating each of learned feature points with each of surrounding feature points. The processor calculates, when the vehicle moves from a first vehicle position to a second vehicle position, a feature point match amount that is a ratio of surrounding feature points associated with learned feature points to the surrounding feature points detected for the second vehicle position; calculates a correction amount such that the correction amount when the feature point match amount is a first feature point match amount is greater than the correction amount when the feature point match amount is a second feature point match amount that is lower than the first feature point match amount; and updates the target parking position based on the correction amount.

13 Claims, 6 Drawing Sheets

PARKING CONTROL METHOD AND PARKING CONTROL DEVICE

TECHNICAL FIELD

The present invention relates to a parking control method and a parking control device.

BACKGROUND

When a vehicle is located near a registered parking position, a parking assistance device described in Japanese Patent Application Publication No. 2021-062684 detects feature points from a captured image acquired from an imaging device, calculates the registered parking position based on the feature points, and automatically parks the vehicle at the calculated registered parking position. Further, the parking assistance device described in Japanese Patent Application Publication No. 2021-062684 calculates and updates the registered parking position each time a predetermined time elapses.

SUMMARY

However, depending on the detection results of the feature points, each time the parking position is calculated and updated, the calculation results of the parking position may vary, resulting in unstable behavior of the vehicle moving toward the parking position.

A problem to be solved by the present invention is to provide a parking control method and a parking control device that suppress variation in the calculation results of a target parking position to stabilize the behavior of the vehicle when parked.

The present invention solves the above problem by: calculating, when a vehicle moves from a first vehicle position to a second vehicle position, a feature point match amount that is an amount of a second surrounding feature point associated with a learned feature point among second surrounding feature points for the second vehicle position; calculating a correction amount such that the correction amount when the feature point match amount is a first feature point match amount is greater than the correction amount when the feature point match amount is a second feature point match amount that is lower than the first feature point match amount; and updating a target parking position based on the correction amount.

According to the present invention, a correction amount for updating the target parking position is calculated such that the correction amount is smaller as the feature point match amount is lower, thereby suppressing variation in the calculation results of the target parking position and stabilizing the behavior of the vehicle when parked.

DETAILED DESCRIPTION

An embodiment of the present invention will be described below with reference to the drawings.

Figure 1:
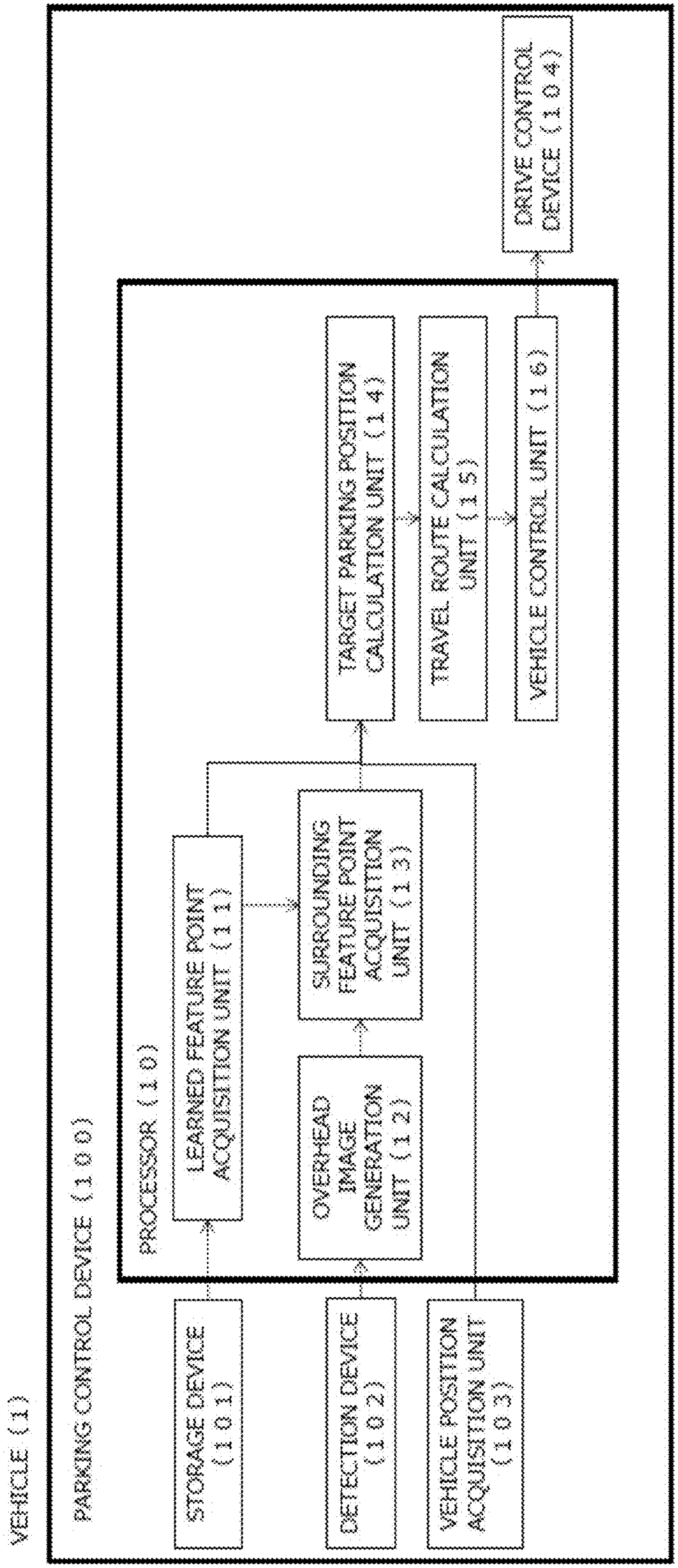
FIG. 1 is a block diagram illustrating a configuration of a parking control device according to an embodiment of the present invention.

FIG. 1 is a block diagram illustrating a configuration of a parking control device 100 of a vehicle 1 according to the embodiment of the present invention. As illustrated in FIG. 1, the parking control device 100 includes a processor 10, a storage device 101, a detection device 102, a vehicle position acquisition unit 103, and a drive control device 104. The parking control device 100 uses the processor 10 to control, for the vehicle 1 when parked, the driving of the vehicle 1 such that the vehicle 1 moves from a current vehicle position P1 to a target parking position P0.

The storage device 101 stores a parking position where the vehicle was previously parked as the target parking position P0. Further, the storage device 101 stores a plurality of feature points for identifying the target parking position P0 as learned feature points F0. Specifically, the storage device 101 stores position information of the learned feature points F0 in a first coordinate system with the target parking position P0 as its origin. Note that a feature point is a characteristic location, such as a boundary of a road marking including white lines and letters drawn on a road surface, and a corner of an object. Note that, in FIG. 2, a learned feature point F0 is represented by a white circle.

Figure 2:
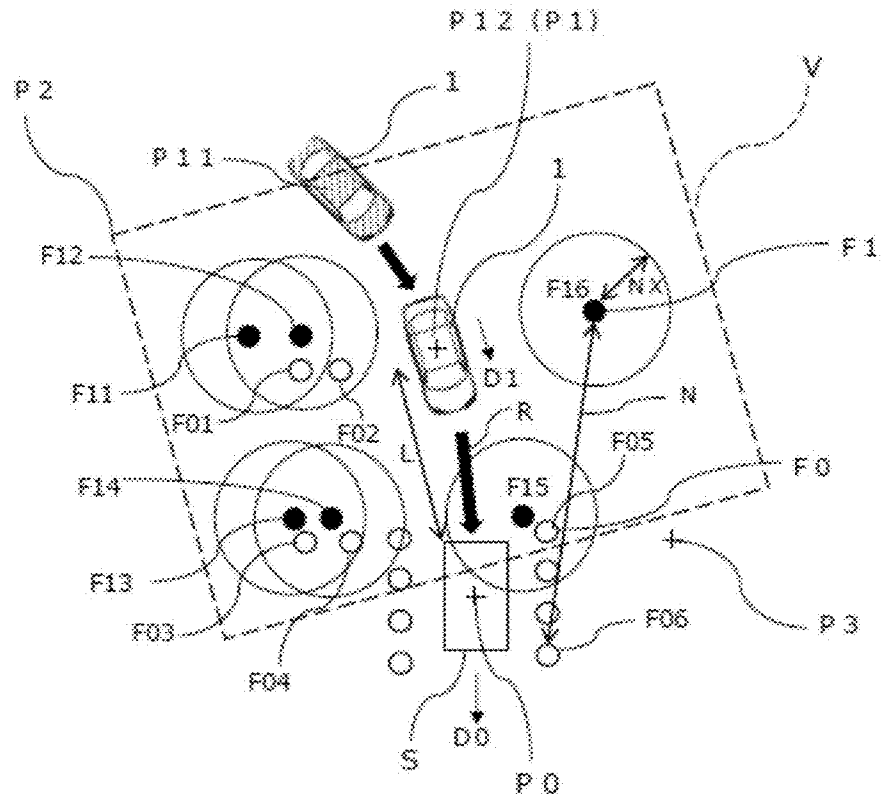
FIG. 2 is a diagram illustrating an example of the positional relationship between a vehicle position and a target parking position, and an example of feature amount matching between learned feature points and surrounding feature points.

The detection device 102 includes, for example, an exterior camera or a radar. The exterior camera is an image sensor such as a CCD wide-angle camera, and is provided on each of the front and rear of the vehicle 1, and as necessary, either side of the vehicle 1, to capture images of the surroundings of the vehicle 1 and acquire image information. The exterior camera may be a stereo camera or an omnidirectional camera, and may include a plurality of image sensors. The radar is provided on each of the front and rear of the vehicle 1, and as necessary, either side of the vehicle 1, and scans a predetermined area around the vehicle 1 by irradiating the surroundings of the vehicle 1 with millimeter waves or ultrasonic waves. Note that the information detected by the detection device 102 includes information on surrounding feature points F1 that are feature points present around the vehicle 1. Thus, the detection device 102 detects the surrounding feature points F1. In FIG. 2, a surrounding feature point F1 is represented by a black circle.

The vehicle position acquisition unit 103 includes a GPS unit, a gyro sensor, a vehicle speed sensor, and the like. The vehicle position acquisition unit 103 detects radio waves transmitted through a plurality of satellite communications with the GPS unit, periodically acquires position information of the vehicle 1, and detects the vehicle position P1, which is the current position of the vehicle 1, based on the acquired position information of the vehicle 30, angle change information acquired from the gyro sensor, and vehicle speed acquired from the vehicle speed sensor. Further, when the vehicle 1 is parked, the vehicle position acquisition unit 103 acquires odometry information of the vehicle 1 (an amount of movement of the vehicle 1 calculated from the motor rotation speed, the axle rotation speed, etc.). Note that the odometry information includes information indicating that the vehicle 1 has moved from a first vehicle position P11 to a second vehicle position P12 in a second coordinate system with a position as its origin (odometry origin P3) (see FIG. 2).

The drive control device 104 uses an autonomous speed control function to control acceleration or deceleration, and the operations of a drive mechanism to adjust the vehicle speed (including the operation of an internal combustion engine for an engine vehicle, the operation of a traveling motor for an electric vehicle, and also the torque distribution between an internal combustion engine and a traveling motor for a hybrid vehicle), as well as the brake operation. Further, the drive control device 104 performs steering control of the vehicle 1 by using an autonomous steering control function to control the operation of a steering actuator.

The processor 10 includes a read only memory (ROM) that stores programs for controlling the operations of the vehicle 1, a central processing unit (CPU) that executes the programs stored in the ROM, and a random access memory (RAM) that functions as an accessible storage device. Note that, as operating circuits, instead of or in addition to the central processing unit (CPU), a micro processing unit (MPU), a digital signal processor (DSP), an application specific integrated circuit (ASIC), a field programmable gate array (FPGA), and the like can be used. The processor 10 includes a learned feature point acquisition unit 11, an overhead image generation unit 12, a surrounding feature point acquisition unit 13, a target parking position calculation unit 14, a travel route calculation unit 15, and a vehicle control unit 16. The learned feature point acquisition unit 11, the overhead image generation unit 12, the surrounding feature point acquisition unit 13, the target parking position calculation unit 14, the travel route calculation unit 15, and the vehicle control unit 16 execute programs to implement their respective functions of the processor 10.

The learned feature point acquisition unit 11 acquires a plurality of learned feature points F0 for identifying a target parking position P0, which are stored in advance in the storage device 101. Specifically, the learned feature point acquisition unit 11 acquires position information of the learned feature points F0 in the first coordinate system with the target parking position P0 as its origin.

The overhead image generation unit 12 generates an overhead image V (AVM image) as illustrated in FIG. 2, based on detection results from the detection device 102. Specifically, the overhead image generation unit 12 generates a right overhead image, a left overhead image, a rear overhead image, and a front overhead image based on right side image data, left side image data, rear image data, and front image data, which are acquired by the detection device 102. The overhead image generation unit 12 then generates a rectangular overhead image V centered on the vehicle 1 based on the right overhead image, the left overhead image, the rear overhead image, and the front overhead image.

The surrounding feature point acquisition unit 13 acquires a plurality of surrounding feature points F1 detected by the detection device 102 mounted on the vehicle 1, for the current vehicle position P1 of the vehicle 1. Further, the surrounding feature point acquisition unit 13 identifies surrounding feature points F1 in the overhead image V of the surroundings of the vehicle 1 generated by the overhead image generation unit 12. Specifically, the surrounding feature point acquisition unit 13 acquires position information of surrounding feature points F1 in a third coordinate system with a position on the overhead image V (e.g., a position P2 in the upper left corner of the overhead image V) as its origin. In other words, for the detection device 102 being a camera, the surrounding feature point acquisition unit 13 acquires surrounding feature points F1 based on the images captured by the detection device 102. Note that, in the first process in processing of calculating the target parking position P0 by the target parking position calculation unit 14, the surrounding feature point acquisition unit 13 acquires surrounding feature points F1 from a wider area than those in the second or subsequent processes.

The target parking position calculation unit 14 calculates the target parking position P0 with respect to the vehicle 1 by associating each of the learned feature points F0 with each of the surrounding feature points F1. Specifically, the target parking position calculation unit 14 performs feature amount matching between learned feature points F0 and surrounding feature points F1, and creates, based on the matching results, feature point pairs, each of which is the combination of a learned feature point F0 and a surrounding feature point F1 that are associated with each other. Note that, in the example of FIG. 2, the feature point pairs created by the feature amount matching are the combination of a learned feature point F01 and a surrounding feature point F11, the combination of a learned feature point F02 and a surrounding feature point F12, the combination of a learned feature point F03 and a surrounding feature point F13, the combination of a learned feature point F04 and a surrounding feature point F14, the combination of a learned feature point F05 and a surrounding feature point F15, and the combination of a learned feature point F06 and a surrounding feature point F16. The target parking position calculation unit 14 then calculates an affine transformation matrix such that the learned feature points F0 and the surrounding feature points F1 are superimposed in the same coordinate system, and performs an affine transformation on the first coordinate system (a coordinate system with the target parking position P0 as its origin) that includes the position information of the learned feature points F0. As a result, the position information of the learned feature points F0 after the affine transformation is transformed into coordinates of a fourth coordinate system with the vehicle position P1 as its origin. The target parking position calculation unit 14 calculates the target parking position P0 in the fourth coordinate system (a coordinate system with the vehicle position P1 as its origin), that is, the target parking position P0 with respect to the vehicle 1, based on the positional relationship between the target parking position P0 and the learned feature points F0 stored in advance.

Further, the target parking position calculation unit 14 calculates the target parking position P0 to update the target parking position P0 each time the vehicle 1 moves a predetermined distance. Specifically, as illustrated in FIG. 2, when the vehicle 1 moves to the second vehicle position P12 that is at a predetermined distance from the first vehicle position P11, the target parking position calculation unit 14 updates the target parking position P0 based on a predetermined correction amount. Specifically, the target parking position calculation unit 14 calculates a first target parking position with respect to the vehicle 1 when the vehicle 1 is at the first vehicle position P11, and when the vehicle 1 moves from the first vehicle position P11 to the second vehicle position P12, calculates a second target parking position with respect to the vehicle 1 when the vehicle 1 is at the second vehicle position P12. The target parking position calculation unit 14 then updates the target parking position P0 based on a correction amount such that the target parking position P0 is made closer to the second target parking position from the first target parking position. Note that, when the detection device 102 has not detected a target parking space S including the target parking position P0, the target parking position calculation unit 14 updates the target parking position P0 each time the vehicle 1 moves a predetermined first distance. Further, when the detection device 102 detects the target parking space S, the target parking position calculation unit 14 updates the target parking position P0 each time the vehicle 1 moves a second distance that is shorter than the first distance. The first distance is, for example, 1 m. The second distance is, for example, 50 cm. In other words, when the detection device 102 detects the target parking space S, the target parking position calculation unit 14 shortens the interval for updating the target parking position P0 compared to when the target parking space S has not been detected. Further, the target parking position calculation unit 14 may continuously or stepwise shorten the interval for updating the target parking position P0 as the vehicle 1 moves closer to the target parking position P0. Further, the target parking position calculation unit 14 may update the target parking position P0 each time a predetermined time elapses.

Further, the target parking position calculation unit 14 calculates a parking distance L between the vehicle position P1 and the target parking space S. When the parking distance L is equal to or longer than a first reference distance that is a reference for whether or not the accuracy of the calculation of the target parking position P0 is equal to or greater than a predetermined accuracy, the target parking position calculation unit 14 does not update the target parking position P0. Here, the first reference distance is, for example, 10 m. Further, when the parking distance L is shorter than a second reference distance that is a reference for whether or not the update of the target parking position P0 will affect the stability of the steering operation of the vehicle 1, the target parking position calculation unit 14 does not update the target parking position P0. Here, the second reference distance is, for example, 50 cm. In other words, when the parking distance L is shorter than the first reference distance and is equal to or longer than the second reference distance, the target parking position calculation unit 14 updates the target parking position P0.

Figure 3:
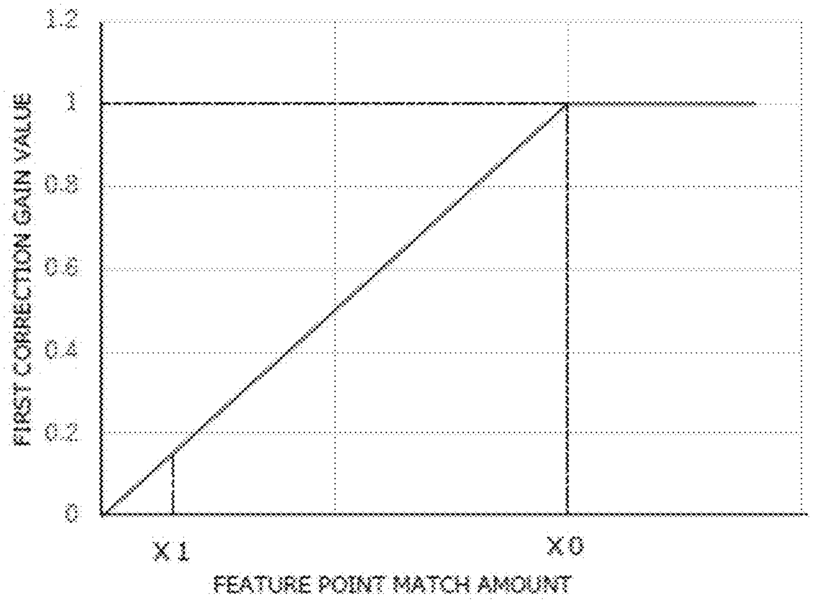
FIG. 3 is a graph illustrating a first correction gain value.
Figure 4:
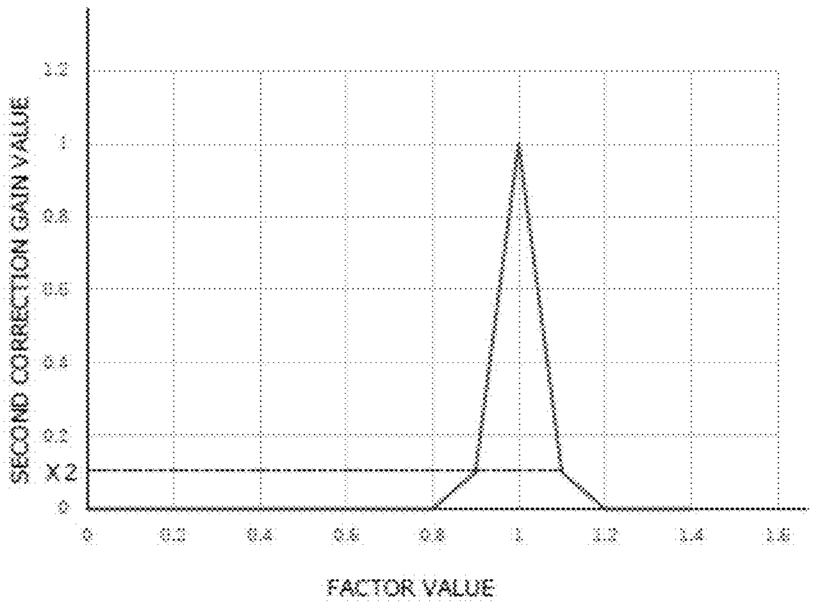
FIG. 4 is a graph illustrating a second correction gain value.

Next, a method for updating the target parking position P0 by the target parking position calculation unit 14 will be specifically described with reference to FIGS. 2 to 4.

When the vehicle 1 moves from the first vehicle position P11 to the second vehicle position P12, the target parking position calculation unit 14 first performs feature amount matching between the surrounding feature points F1 detected for the second vehicle position P12 and the learned feature points F0. Next, the target parking position calculation unit 14 acquires a previous affine transformation matrix A1 used to calculate the target parking position P0 when the vehicle 1 was at the first vehicle position P11. Furthermore, the target parking position calculation unit 14 calculates a provisional affine transformation matrix A2 based on the previous affine transformation matrix A1 and odometry information indicating an amount of movement of the vehicle position P1 acquired by the vehicle position acquisition unit 103 (an amount of movement from the first vehicle position P11 to the second vehicle position P12). Furthermore, the target parking position calculation unit 14 performs an affine transformation on the first coordinate system, which includes the position information of the learned feature points F0 stored in advance, by using the provisional affine transformation matrix A2, and transforms the first coordinate system into a coordinate system with the second vehicle position P12 as its origin, as illustrated in FIG. 2. The target parking position calculation unit 14 then calculates a feature point distance N (norm) between the learned feature point F0 and the surrounding feature point F1 that are associated with each other. The target parking position calculation unit 14 determines, for each feature point pair of a learned feature point F0 and a surrounding feature point F1, whether or not the feature point distance N is equal to or longer than a predetermined threshold distance NX (whether or not a corresponding learned feature point F0 is present within a circle of radius NX centered on each of the surrounding feature points F1). The target parking position calculation unit 14 then excludes feature point pairs for which the feature point distance N is equal to or longer than the predetermined threshold distance NX as outliers from the feature point pairs to be used to calculate the target parking position P0. Further, the target parking position calculation unit 14 excludes the outliers to calculate the target parking position P0 by using the RANSAC technique. Note that, in the following description, the processing of excluding the outliers as described above will be referred to as "filtering processing."

Next, the target parking position calculation unit 14 calculates a new affine transformation matrix A20 based on the feature point pairs in which the outliers have been excluded. Here, the target parking position calculation unit 14 calculates the number of surrounding feature points F1 associated with the learned feature points F0, that is, the number of feature point pairs. The target parking position calculation unit 14 then calculates, based on the number of feature point pairs, a feature point match amount that is an amount of a surrounding feature point F1 associated with a learned feature point F0 among the surrounding feature points F1 detected for the second vehicle position P12. Furthermore, the target parking position calculation unit 14 then calculates, based on a graph of FIG. 3, a first correction gain value G1 that takes a value ranging from 0 to 1 according to the feature point match amount. As illustrated in FIG. 3, when the feature point match amount is equal to or greater than 0 and less than a predetermined value X0, the first correction gain value G1 is larger as the feature point match amount is higher, that is, as the number of feature point pairs is larger. Further, when the feature point match amount is equal to or greater than the predetermined value X, the first correction gain value G1 is 1, which is the maximum value. Note that the feature point match amount may be the number of surrounding feature points F1 associated with the learned feature points F0, or may be the ratio of the surrounding feature points F1 associated with the learned feature points F0 to the surrounding feature points F1 detected for the vehicle position P1.

Further, the target parking position calculation unit 14 calculates, as a second correction gain value G2, a feature point coincidence indicating a degree of coincidence between the positions of a learned feature point F0 and a surrounding feature point F1 that are associated with each other when the learned feature points F0 and the surrounding feature points F1 are displayed in the same coordinate system. Specifically, the target parking position calculation unit 14 calculates a factor value (a factor) that represents an aspect ratio between the position (coordinates) of a learned feature point F0 and the position (coordinates) of a surrounding feature point F1 with respect to the origin (second vehicle position P12) of the coordinate system. As the factor value is closer to 1, the position of the surrounding feature point F1 and the position of the learned feature point F0 are closer to each other, and when the factor value is 1, the position of the surrounding feature point F1 coincides with the position of the learned feature point F0. On the other hand, as the factor value is farther away from 1, the position of the learned feature point F0 and the position of the surrounding feature point F1 are farther from each other. Note that the deviation in position between the learned feature point F0 and the surrounding feature point F1 is caused by, for example, the inclination of the road surface. As illustrated in FIG. 4, as the factor value is closer to 1, the second correction gain value is larger, approaching 1, which is the maximum value. In other words, the second correction gain value is a feature point coincidence indicating a degree of coincidence between the positions of the learned feature point F0 and the surrounding feature point F1 that are associated with each other. Thus, the target parking position calculation unit 14 calculates a second correction gain value G2 that takes a value ranging from 0 to 1 according to the feature point coincidence, based on the graph illustrated in FIG. 4.

The target parking position calculation unit 14 calculates a correction gain value G that is an average value of the first correction gain value G1 and the second correction gain value G2, by the following Equation (1).

$$G=(G1+G2)/2 \quad (1)$$

Furthermore, the target parking position calculation unit 14 corrects a new affine transformation matrix A20 based on the correction gain value G by using the following Equation (2) to calculate a corrected affine transformation matrix A21. The corrected affine transformation matrix A21 corresponds to the correction amount for updating the target parking position P0.

$$A21=A1+G\times(A20-A1) \quad (2)$$

Note that when the correction gain value G is 1, the corrected affine transformation matrix A21 has the same value as the new affine transformation matrix A20. In other words, when the correction gain value G is 1, the target parking position calculation unit 14 does not correct the new affine transformation matrix A20.

Specifically, the target parking position calculation unit 14 calculates a correction amount for updating the target parking position P0 such that a correction amount when the feature point match amount is a first feature point match amount is greater than a correction amount when the feature point match amount is a second feature point match amount that is lower than the first feature point match amount. In other words, the target parking position calculation unit 14 calculates a correction amount such that the correction amount is larger as the feature point match amount is larger. Further, the target parking position calculation unit 14 calculates a correction amount for updating the target parking position P0 such that a correction amount when the feature point coincidence is a first feature point coincidence is greater than a correction amount when the feature point coincidence is a second feature point coincidence that is lower than the first feature point coincidence. In other words, the target parking position calculation unit 14 calculates a correction amount such that the correction amount is larger as the feature point coincidence is larger.

Note that the target parking position calculation unit 14 may calculate the correction amount using the first correction gain value G1 as the correction gain value G without using the second correction gain value G2.

Note that when the feature point match amount is less than a predetermined first threshold value X1, that is, when the number of feature point pairs is less than a predetermined threshold value, the target parking position calculation unit 14 does not update the target parking position P0. Further, when the feature point coincidence (second correction gain value G2) is less than a predetermined second threshold value X2, the target parking position calculation unit 14 does not update the target parking position P0.

Further, the target parking position calculation unit 14 may acquire a parking direction D0 of the vehicle 1 at the target parking position P0, and calculate a correction amount (corrected affine transformation matrix A21) such that a correction amount when a parking angle between a traveling direction D1 and a parking direction D0 of the vehicle 1 is a first parking angle is smaller than a correction amount when the parking angle is a second parking angle that is smaller than the first parking angle. In other words, the target parking position calculation unit 14 may calculate a correction amount for updating the target parking position P0 such that the correction amount is smaller as a difference between the traveling direction D1 and the parking direction D0 is larger.

Next, the travel route calculation unit 15 illustrated in FIG. 1 acquires the target parking position P0 calculated by the target parking position calculation unit 14, and calculates a travel route R for the vehicle 1 to reach the target parking position P0 from the vehicle position P1. Further, when the target parking position calculation unit 14 updates the target parking position P0, the travel route calculation unit 15 modifies the travel route R to match the updated target parking position P0.

The vehicle control unit 16 outputs a control command to the drive control device 104 to move the vehicle 1 to the target parking position P0 along the travel route calculated by the travel route calculation unit 15.

Next, the sequence of a parking control method performed by the parking control device 100 when the vehicle 1 moves from the first vehicle position P11 to the second vehicle position P12 will be described with reference to a flowchart illustrated in FIG. 5.

First, in step S1, the learned feature point acquisition unit 11 acquires the position information of the learned feature points F0 that are stored in advance in the storage device 101.

Next, in step S2, the surrounding feature point acquisition unit 13 acquires the position information of the surrounding feature points F1 detected by the detection device 102.

Furthermore, in step S3, the target parking position calculation unit 14 performs feature amount matching between the learned feature points F0 and the surrounding feature points F1.

Next, in step S4, the target parking position calculation unit 14 performs the filtering processing of excluding feature point pairs determined as outliers from the feature point pairs of the learned feature points F0 and the surrounding feature points F1.

Then, in step S5, the target parking position calculation unit 14 calculates a feature point match amount, which is an amount of a surrounding feature point F1 associated with a learned feature point F0 among the surrounding feature points F1.

Further, in step S6, the target parking position calculation unit 14 calculates a feature point coincidence indicating a degree of coincidence between the positions of the learned feature point F0 and the surrounding feature point F1 that are associated with each other, when the learned feature points F0 and the surrounding feature points F1 are displayed in the same coordinate system.

Next, in step S7, the target parking position calculation unit 14 determines whether or not the feature point match amount is less than the first threshold value X1. If the feature point match amount is less than the first threshold value X1, the processor 10 ends the control without updating the target parking position P0.

On the other hand, if it is determined in step S7 that the feature point match amount is equal to or greater than the first threshold value X1, then in step S8, the target parking position calculation unit 14 determines whether or not the feature point coincidence is less than the second threshold value X2. If the feature point coincidence is less than the second threshold value X2, the processor 10 ends the control without updating the target parking position P0.

On the other hand, if it is determined in step S8 that the feature point coincidence is equal to or greater than the second threshold value X2, that is, if the feature point match amount is equal to or greater than the first threshold value X1 and the feature point coincidence is equal to or greater than the second threshold value X2, then in step S9, the target parking position calculation unit 14 calculates a correction amount (corrected affine transformation matrix A21) based on the feature point match amount and the feature point coincidence. Then, in step S10, the target parking position calculation unit 14 updates the target parking position P0 by using the correction amount (corrected affine transformation matrix A21) calculated in step S9.

Figure 5:
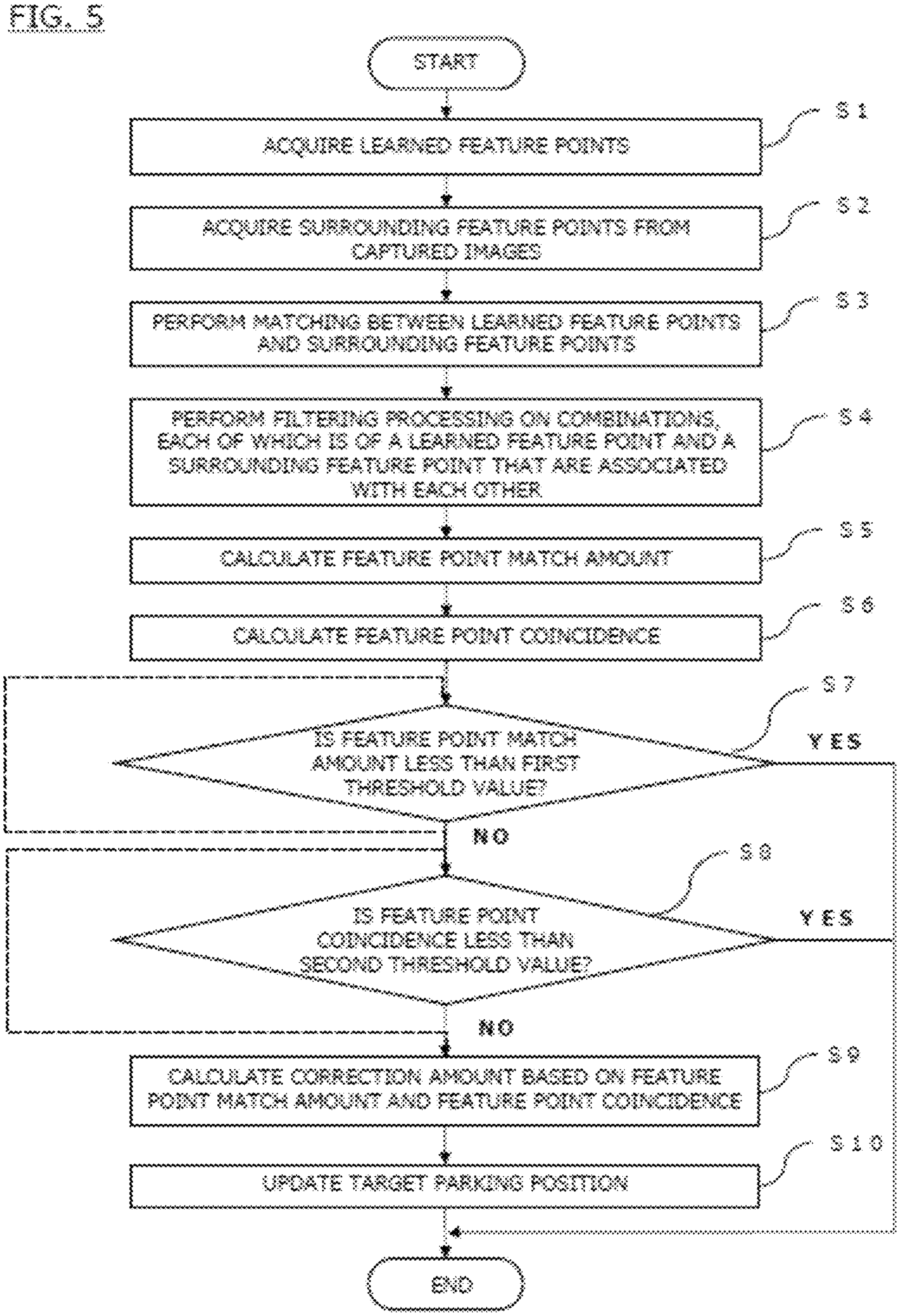
FIG. 5 is a flowchart illustrating a sequence of a parking control method performed by the parking control device illustrated in FIG. 1.

Note that, as indicated by dashed lines in the flowchart of FIG. 5, either or both of the process of step S7 and the process of step S8 may be skipped. Further, the process of step S5 and the process of step S6 may be performed simultaneously, or the process of step S5 may be performed after the process of step S6. Further, the process of step S7 may be performed after the process of step S8.

Figure 6:
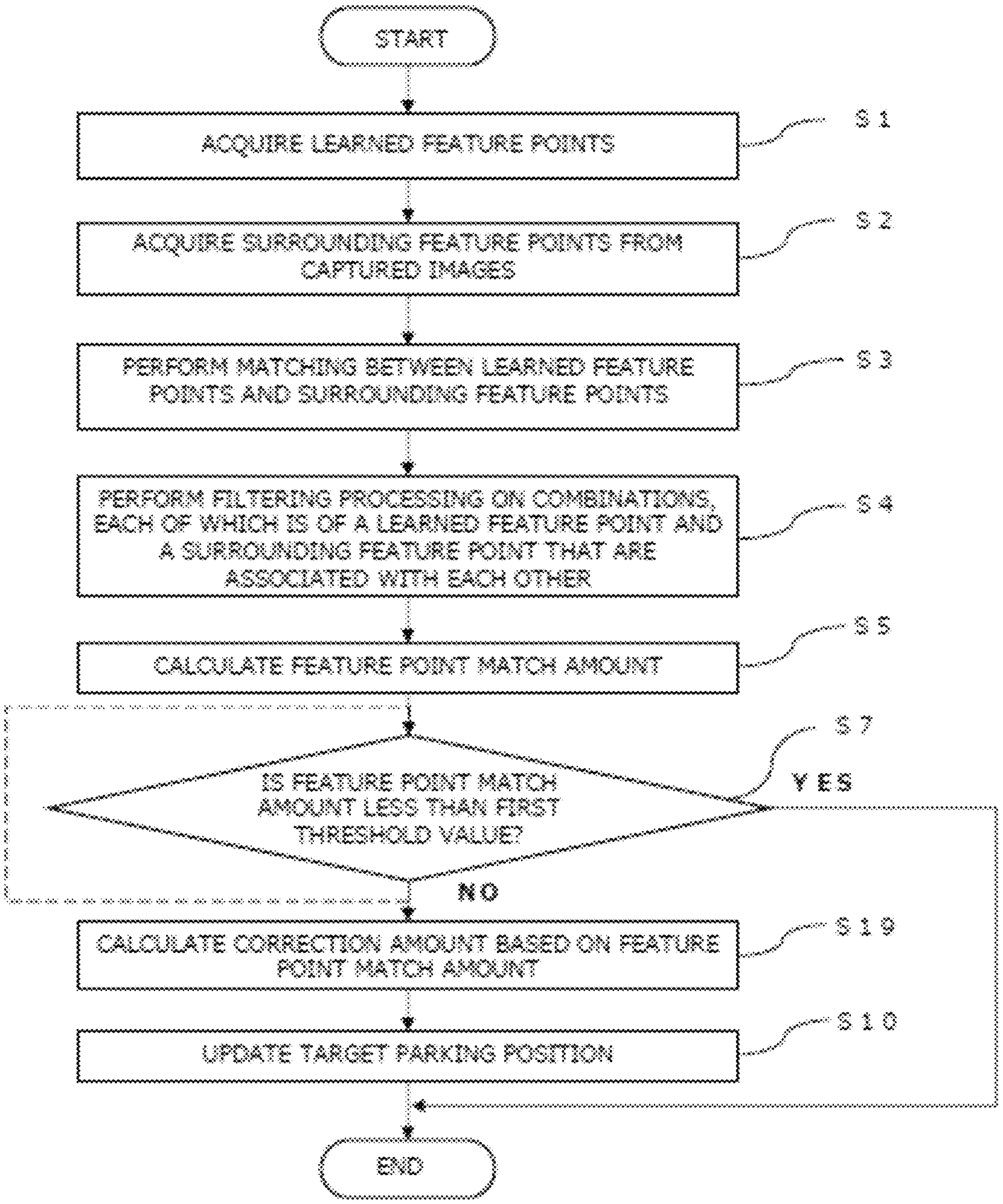
FIG. 6 is a flowchart illustrating another example of the sequence of the parking control method performed by the parking control device illustrated in FIG. 1.

Further, as illustrated in a flowchart of FIG. 6, the processes of steps S6 and S8 may be eliminated, and in step S19, the target parking position calculation unit 14 may correct the new affine transformation matrix A20 based only on the feature point match amount to calculate a corrected affine transformation matrix A21.

From the above, the processor 10 of the parking control device 100 in the present embodiment calculates a first target parking position with respect to the vehicle 1 when the vehicle 1 is at the first vehicle position P11, and when the vehicle 1 moves from the first vehicle position P11 to the second vehicle position P12, calculates a second target parking position with respect to the vehicle 1 when the vehicle 1 is at the second vehicle position P12. When the vehicle 1 moves from the first vehicle position P11 to the second vehicle position P12, the processor 10 then calculates, based on the number of feature point pairs, a feature point match amount that is an amount of a surrounding feature point F1 associated with a learned feature point F0 among the surrounding feature points F1 detected for the second vehicle position P12. The processor 10 then calculates a correction amount (corrected affine transformation matrix A21) such that a correction amount when the feature point match amount is a first feature point match amount is greater than a correction amount when the feature point match amount is a second feature point match amount that is lower than the first feature point match amount. The processor 10 updates, based on the calculated correction amount (corrected affine transformation matrix A21), the target parking position P0 such that the target parking position P0 is made closer to the second target parking position from the first target parking position. In other words, the parking control device 100 calculates a correction amount for updating the target parking position P0 such that the correction amount is smaller as the feature point match amount is smaller. As a result, in consideration of the actual situation that there is a high incidence of erroneous detection of surrounding feature points F1 for a low feature point match amount, the parking control device 100 can reduce the impact of erroneous detection of surrounding feature points F1 on the update of the target parking position P0. Therefore, even when the parking control device 100 updates the target parking position P0 as the vehicle 1 moves, it is possible to suppress variation in the calculation results of the target parking position P0 and stabilize the behavior of the vehicle 1 when parked.

Further, in the present embodiment, the detection device 102 is a camera(s) mounted on the vehicle 1. This allows the parking control device 100 to acquire the surrounding feature points F1 based on an image(s) captured by the camera (s).

Further, the parking control device 100 calculates a feature point coincidence indicating a degree of coincidence between the positions of the learned feature point F0 and the surrounding feature point F1 that are associated with each other, when the learned feature points F0 and the surrounding feature points F1 are displayed in the same coordinate system. The parking control device 100 then calculates a correction amount (corrected affine transformation matrix A21) such that a correction amount when the feature point coincidence is a first feature point coincidence is greater than a correction amount when the feature point coincidence is a second feature point coincidence that is lower than the first feature point coincidence. In other words, the parking control device 100 calculates a correction amount for updating the target parking position P0 such that the correction amount is smaller as the feature point coincidence is smaller. As a result, in consideration of the actual situation that, for a low feature point coincidence, there is a large positional deviation between the learned feature point F0 and the surrounding feature point F1 in the same coordinate system, the parking control device 100 can reduce the impact of the positional deviation between the learned feature point F0 and the surrounding feature point F1 in the same coordinate system on the calculation results of the target parking position P0. Therefore, even when the parking control device 100 updates the target parking position P0 as the vehicle 1 moves, it is possible to suppress variation in the calculation results of the target parking position P0 and stabilize the behavior of the vehicle 1 when parked.

The parking control device 100 calculates a first correction gain value G1 according to the feature point match amount. The parking control device 100 also calculates a second correction gain value G2 according to the feature point coincidence. The parking control device 100 calculates a correction gain value G that is an average value of the first correction gain value G1 and the second correction gain value G2, and calculates a correction amount (corrected affine transformation matrix A21) based on the correction gain value G. This allows the parking control device 100 to calculate a correction amount (corrected affine transformation matrix A21) according to the feature point match amount and the feature point coincidence.

The parking control device 100 calculates a feature point distance N between the positions of a learned feature point F0 and a surrounding feature point F1 that are associated with each other, when the learned feature points F0 and the surrounding feature points F1 are displayed in the same coordinate system. The parking control device 100 calculates a target parking position P0 by excluding, from among the combinations (feature point pairs) of learned feature points F0 and surrounding feature points F1 that are associated with each other, combinations (feature point pairs) having the feature point distance N equal to or greater than a predetermined threshold distance NX. As a result, the parking control device 100 excludes feature point pairs determined as outliers to calculate the target parking position P0, and can therefore calculate the target parking position P0 more accurately.

When the vehicle 1 moves from the first vehicle position P11 to the second vehicle position P12, if the feature point match amount is less than the predetermined first threshold value X1, the parking control device 100 does not update the target parking position P0. In other words, if the feature point match amount is less than the predetermined first threshold value X1 (if the number of feature point pairs is less than a predetermined threshold value), there is a possibility that the target parking position calculation unit 14 will not be able to accurately calculate the target parking position P0, and therefore the parking control device 100 controls the driving of the vehicle 1 based on the previously calculated target parking position P0, without updating the target parking position P0. This enables the parking control device 100 to suppress variation in the calculation results of the target parking position P0 and stabilize the behavior of the vehicle 1 when parked.

Further, when the vehicle 1 moves from the first vehicle position P11 to the second vehicle position P12, if the feature point coincidence (second correction gain value G2) is less than the predetermined second threshold value X2, the parking control device 100 does not update the target parking position P0. In other words, if the feature point coincidence is less than the predetermined second threshold value X2, there is a possibility that the target parking position calculation unit 14 will not be able to accurately calculate the target parking position P0, and therefore the parking control device 100 controls the driving of the vehicle 1 based on the previously calculated target parking position P0, without updating the target parking position P0. This enables the parking control device 100 to suppress variation in the calculation results of the target parking position P0 and stabilize the behavior of the vehicle 1 when parked.

Further, the parking control device 100 calculates a parking distance L between the vehicle position P1 and a target parking space S including the target parking position P0, and if the parking distance L is equal to or longer than a first reference distance, does not update the target parking position P0. Note that the first reference distance is a distance that is a reference for whether or not the accuracy of the calculation of the target parking position P0 is equal to or greater than a predetermined accuracy. This enables the parking control device 100 to maintain the accuracy of the calculation of the target parking position P0 at a predetermined level or higher.

Further, if the parking distance L is shorter than a second reference distance, the parking control device 100 does not update the target parking position P0. The second reference distance is a distance that is a reference for whether or not the update of the target parking position P0 will affect the stability of the steering operation of the vehicle 1. This enables the parking control device 100 to control the driving of the vehicle 1 while maintaining the stability of the steering operation of the vehicle 1.

Further, the parking control device 100 updates the target parking position P0 each time the vehicle 1 moves a predetermined distance. Specifically, the parking control device 100 calculates and updates the target parking position P0 based on the newly acquired surrounding feature points F1 each time the vehicle position P1 moves a predetermined distance. This enables the parking control device 100 to accurately calculate the target parking position P0 according to changes in the vehicle position P1.

When the detection device 102 has not detected the target parking space S, the parking control device 100 updates the target parking position P0 each time the vehicle 1 moves a predetermined first distance. Further, when the detection device 102 detects the target parking space S, the target parking position P0 is updated each time the vehicle 1 moves a second distance that is shorter than the first distance. In other words, when the detection device 102 detects the target parking space S, the parking control device 100 shortens the interval for updating the target parking position P0 compared to when the target parking space S has not been detected. As a result, the parking control device 100 increases the frequency of updating the target parking position P0 once the accurate position of the target parking space S is grasped, and therefore the parking control device 100 can calculate the target parking position P0 with greater accuracy.

Further, the parking control device 100 acquires a parking direction D0 of the vehicle 1 at the target parking position P0. The parking control device 100 calculates a correction amount for updating the target parking position P0 such that a correction amount when a parking angle between a traveling direction D1 and the parking direction D0 of the vehicle 1 (a difference between the traveling direction D1 and the parking direction D0 of the vehicle 1) is a first parking angle is smaller than a correction amount when the parking angle is a second parking angle that is smaller than the first parking angle. In other words, the parking control device 100 calculates a correction amount for updating the target parking position P0 such that the correction amount is smaller as the difference between the traveling direction D1 and the parking direction D0 of the vehicle 1 is larger. Thus, the greater the difference between the traveling direction D1 and the parking direction D0 of the vehicle 1, the lower the accuracy of the odometry information (movement information of the vehicle position P1) acquired by the vehicle position acquisition unit 103. Therefore, the parking control device 100 calculates a correction amount such that the correction amount is smaller as the parking angle is larger, thereby making it possible to suppress the variation in the calculation results of the target parking position P0.

DESCRIPTION OF REFERENCE NUMERALS

100 Parking control device
1 Vehicle
10 Processor
11 Learned feature point acquisition unit
13 Surrounding feature point acquisition unit
14 Target parking position calculation unit
101 Storage device
102 Detection device
F0 Learned feature point
F1 Surrounding feature point
L Parking distance
N Feature point distance NX Threshold distance
P0 Target parking position
P1 Vehicle position
P11 First vehicle position
P12 Second vehicle position
S Target parking space

The invention claimed is:

1. A parking control method comprising, by using a processor:

acquiring a plurality of surrounding feature points detected by a detection device mounted on a vehicle at a current vehicle position of the vehicle;

acquiring a plurality of learned feature points for identifying a target parking position, the learned feature points being stored in advance in a storage device;

calculating the target parking position with respect to the vehicle by associating each of the learned feature points with each of the surrounding feature points; and controlling driving of the vehicle such that the vehicle moves from the current vehicle position to the target parking position, the parking control method comprising, by the processor:

calculating a first target parking position with respect to the vehicle when the vehicle is at a first vehicle position;

when the vehicle moves from the first vehicle position to a second vehicle position:

calculating a second target parking position with respect to the vehicle when the vehicle is at the second vehicle position;

calculating a feature point match amount that is an amount of the surrounding feature point associated with one of the learned feature points among the surrounding feature points detected for the second vehicle position;

calculating a correction amount such that the correction amount when the feature point match amount is a first feature point match amount is greater than the correction amount when the feature point match amount is a second feature point match amount that is lower than the first feature point match amount;

updating the target parking position based on the correction amount such that the target parking position is made closer to the second target parking position from the first target parking position; and controlling driving of the vehicle such that the vehicle moves to the updated target parking position.

2. The parking control method according to claim 1, wherein the detection device is a camera mounted on the vehicle.

3. The parking control method according to claim 1, comprising, by the processor:

calculating a feature point coincidence indicating a degree of coincidence between positions of the learned feature point and the surrounding feature point that are associated with each other when the learned feature points and the surrounding feature points are displayed in a same coordinate system; and calculating the correction amount such that the correction amount when the feature point coincidence is a first feature point coincidence is greater than the correction amount when the feature point coincidence is a second feature point coincidence that is lower than the first feature point coincidence.

4. The parking control method according to claim 3, comprising, by the processor:

calculating a first correction gain value according to the feature point match amount;

calculating a second correction gain value according to the feature point coincidence;

calculating a correction gain value that is an average value of the first correction gain value and the second correction gain value; and calculating the correction amount based on the correction gain value.

5. The parking control method according to claim 3, comprising, by the processor, not updating the target parking position, when the vehicle moves from the first vehicle position to the second vehicle position and when the feature point coincidence is less than a predetermined second threshold value.

6. The parking control method according to claim 1, comprising, by the processor:

calculating a feature point distance between positions of the learned feature point and the surrounding feature point that are associated with each other when the learned feature points and the surrounding feature points are displayed in a same coordinate system; and calculating the target parking position by excluding, from among combinations of the learned feature points and the surrounding feature points that are associated with each other, combinations having the feature point distance equal to or greater than a predetermined threshold distance.

7. The parking control method according to claim 1, comprising, by the processor, not updating the target parking position, when the vehicle moves from the first vehicle position to the second vehicle position and when the feature point match amount is less than a predetermined first threshold value.

8. The parking control method according to claim 1, comprising, by the processor:

calculating a parking distance between the vehicle position and a target parking space including the target parking position; and not updating the target parking position when the parking distance is equal to or longer than a first reference distance that is a reference for whether or not an accuracy of calculation of the target parking position is equal to or greater than a predetermined accuracy.

9. The parking control method according to claim 1, comprising, by the processor:

calculating a parking distance between the vehicle position and a target parking space including the target parking position; and not updating the target parking position, when the parking distance is shorter than a second reference distance that is a reference for whether or not the target parking position being updated will affect stability of steering operation of the vehicle.

10. The parking control method according to claim 1, comprising, by the processor, updating the target parking position each time the vehicle moves a predetermined distance.

11. The parking control method according to claim 10, comprising, by the processor:

updating the target parking position each time the vehicle moves a predetermined first distance, when the detection device has not detected a target parking space including the target parking position; and updating the target parking position each time the vehicle moves a second distance that is shorter than the first distance, when the detection device detects the target parking space.

12. The parking control method according to claim 1, comprising, by the processor:

acquiring a parking direction of the vehicle at the target parking position; and calculating the correction amount such that the correction amount when a parking angle between a traveling direction of the vehicle and the parking direction is a first parking angle is smaller than the correction amount when the parking angle is a second parking angle that is smaller than the first parking angle.

13. A parking control device comprising a processor, the processor being configured to:

acquire a plurality of surrounding feature points detected by a detection device mounted on a vehicle, for a current vehicle position of the vehicle;

acquire a plurality of learned feature points for identifying a target parking position, the learned feature points being stored in advance in a storage device;

calculate the target parking position with respect to the vehicle by associating each of the learned feature points with each of the surrounding feature points; and control driving of the vehicle such that the vehicle moves from the current vehicle position to the target parking position, wherein the processor is configured to:

calculate a first target parking position with respect to the vehicle when the vehicle is at a first vehicle position;

when the vehicle moves from a first vehicle position to a second vehicle position, calculate a second target parking position with respect to the vehicle when the vehicle is at the second vehicle position;

calculate a feature point match amount that is an amount of the surrounding feature point associated with one of the learned feature points among the surrounding feature points detected for the second vehicle position;

calculate a correction amount such that the correction amount when the feature point match amount is a first feature point match amount is greater than the correction amount when the feature point match amount is a second feature point match amount that is lower than the first feature point match amount;

update the target parking position based on the correction amount such that the target parking position is made closer to the second target parking position from the first target parking position; and control driving of the vehicle such that the vehicle moves to the updated target parking position.

* * * * *